(12) United States Patent
Pineda de Gyvez et al.

(10) Patent No.: US 11,461,642 B2
(45) Date of Patent: Oct. 4, 2022

(54) APPARATUS FOR PROCESSING A SIGNAL

(71) Applicants: NXP B.V., Eindhoven (NL); TECHNISCHE UNIVERSITEIT EINDHOVEN, Eindhoven (NL)

(72) Inventors: Jose De Jesus Pineda de Gyvez, Eindhoven (NL); Hamed Fatemi, San Jose, CA (US); Emad Ayman Taleb Ibrahim, Eindhoven (NL)

(73) Assignee: NXP B.V., Eindhoven (NL)

( * ) Notice: Subject to any disclaimer, the term of this patent is extended or adjusted under 35 U.S.C. 154(b) by 303 days.

(21) Appl. No.: 16/566,991

(22) Filed: Sep. 11, 2019

(65) Prior Publication Data
US 2020/0090040 A1 Mar. 19, 2020

(30) Foreign Application Priority Data

Sep. 13, 2018 (EP) .................................... 18194358

(51) Int. Cl.
*G06N 3/08* (2006.01)
*G06N 20/10* (2019.01)
*G06F 3/01* (2006.01)
*G10L 15/16* (2006.01)

(52) U.S. Cl.
CPC .............. *G06N 3/08* (2013.01); *G06F 3/011* (2013.01); *G06F 3/017* (2013.01); *G06N 20/10* (2019.01); *G10L 15/16* (2013.01)

(58) Field of Classification Search
CPC .......... G06N 3/08; G06N 20/10; G06F 3/011; G06F 3/017; G10L 15/16
See application file for complete search history.

(56) References Cited

U.S. PATENT DOCUMENTS

| | | | | | |
|---|---|---|---|---|---|
| 5,315,704 A | * | 5/1994 | Shinta | ..................... | G10L 25/78 704/232 |
| 5,586,215 A | * | 12/1996 | Stork | ................. | G06K 9/00268 704/232 |
| 5,621,858 A | * | 4/1997 | Stork | ................. | G06K 9/00268 704/232 |

(Continued)

OTHER PUBLICATIONS

Zhang et al.: "Towards End-to-End Speech Recognition with Deep Convolutional Neural Networks," INTERSPEECH Sep. 8-12, 2016, 2016, San Francisco, USA, pp. 410-414.

(Continued)

*Primary Examiner* — Raymond L Nimox

(57) ABSTRACT

An apparatus for processing a signal for input to a neural network, the apparatus configured to: receive a signal comprising a plurality of samples of an analog signal over time; determine at least one frame comprising a group of consecutive samples of the signal, wherein the or each frame includes a first number of samples; for each frame, determine a set of correlation values comprising a second number of correlation values, the second number less than the first number, each correlation value of the set of correlation values based on an autocorrelation of the frame at a plurality of different time lags; provide an output based on the set of correlation values corresponding to the or each of the frames for a neural network for one or more of classification of the analog signal by the neural network and training the neural network based on a predetermined classification.

18 Claims, 4 Drawing Sheets

(56) References Cited

U.S. PATENT DOCUMENTS

| | | | |
|---|---|---|---|
| 6,119,083 A * | 9/2000 | Hollier | G10L 19/018 348/742 |
| 2009/0279777 A1* | 11/2009 | Malfait | H04N 17/00 382/168 |
| 2013/0144614 A1* | 6/2013 | Myllyla | G10L 25/78 704/210 |
| 2013/0179158 A1 | 7/2013 | Nakamura et al. | |
| 2015/0032449 A1 | 1/2015 | Sainath et al. | |
| 2015/0242690 A1* | 8/2015 | Richert | G06K 9/6215 382/103 |
| 2015/0255062 A1 | 9/2015 | Penn et al. | |
| 2017/0287498 A1 | 10/2017 | Petkov et al. | |
| 2021/0125050 A1* | 4/2021 | Wang | G06N 3/08 |

OTHER PUBLICATIONS

A. Graves, "Supervised Sequence Labelling," in Supervised sequence labelling with recurrent neural networks, 2012, pp. 1-124.

Abdel-Hamid et al.: "Convolutional Neural Networks for Speech Recognition," IEEE/ACM Transactions on Audio, Speech, and Language Processing, vol. 22, No. 10, Oct. 2014, pp. 1533-1545.

Deng Shi-Wen et al : 11 Towards heart sound classification without segmentation via autocorrelation feature and diffusion maps 11, Future Generations Computer Systems, Elsevier Science Publishers . Amsterdam, NL, vol. 60, Feb. 1, 2016 (Feb. 1, 2016), pp. 13-21.

Dennis et al.: "Spectrogram image feature for sound event classification in mismatched conditions," IEEE Signal Processing Letters, vol. 18, No. 2, Feb. 2011, pp. 130-133.

François Chollet, "Keras," GitHub, 2015. [Online], Available: https://github.com/keras-team/keras.

Gelzinis A et al : "Automated speech analysis applied to laryngeal disease categorization", Computer Methods and Programs in Biomedicine, Elsevier, Amsterdam, NL, vol. 91, No. I, Jul. 1, 2008 (Jul. 1, 2008), pp. 36-47.

Graves et al.: "Speech Recognition with Deep Recurrent Neural Networks," ICASSP, IEEE Int. Conf. Acoust. Speech Signal Process.—Proc., 2013, pp. 6645-6649.

Graves et al.: "Towards End-to-End Speech Recognition with Recurrent Neural Networks," JMLR Workshop Conf. Proc., vol. 32, No. 1, 2014, pp. 1764-1772.

Greff et al.: "LSTM: A Search Space Odyssey," IEEE Trans. Neural Networks Learn. Syst., vol. 28, No. 10, 2017, pp. 2222-2232.

Jaitly et al.: "Learning a Better Representation of Speech Sound Waves Using Restricted Boltzmann Machines," Proc. ICASSP, vol. 1, 2011, pp. 5884-5887.

Joao Henrique F Flores et al: "Autocorrelation and partial autocorrelation functions to improve neural networks models on univariate time series forecasting", Neural Networks (IJ CNN), The 2012 International Joint Conference On, IEEE, Jun. 10, 2012 (Jun. 10, 2012), pp. 1-8.

LeCun et al.: "Convolution Networks for Images, Speech, and Time-Series," in The Handbook of Brain Theory and Neural Networks, 1995.

Lee et al.: "Unsupervised feature learning for audio classification using convolutional deep belief networks," Advances in Neural Information Processing Systems 22 (NIPS 2009) 2009, pp. 1-9.

Manoj C et al : 11 Novel approach for detecting applause in continuous meeting speech 11 , Electronics Computer Technology (ICECT), 2011 3rd International Conference On, IEEE, Apr. 8, 2011 (Apr. 8, 2011), pp. 182-186.

McLoughlin et al.: "Robust Sound Event Classification Using Deep Neural Networks," Audio, Speech, Lang. Process. IEEE/ACM Trans., vol. 23, No. 3, pp. 540-552, 2015.

Ravanelli et al.: "Improving speech recognition by revising gated recurrent units," Proc. Annu. Conf. Int. Speech Commun. Assoc. INTERSPEECH, vol. 2017—August, pp. 1308-1312.

Shrawankar et al.: "Techniques for Feature Extraction in Speech Recognition System: A Comparative Study", International Journal of Computer Applications in Engineering, Technology and Sciences (IJCAETS), 2010, pp. 1-9.

Warden P. Speech Commands, "A public dataset for single-word speech recognition," 2017. [Online], Available: http://download.tensorflow.org/data/speech_commands_v0.01.tar.gz%22.

Zeiler, "ADADELTA: An Adaptive Learning Rate Method," 2012, pp. 1-6.

Zhang, et al.: "Robust sound event recognition using convolutional neural networks," ICASSP, IEEE Int. Conf. Acoustics. Speech Signal Processing, Apr. 19-24, 2015, pp. 559-563.

* cited by examiner

APPARATUS FOR PROCESSING A SIGNAL

CROSS-REFERENCE TO RELATED APPLICATIONS

This application claims the priority under 35 U.S.C. § 119 of European Patent application no. 18194358.0, filed on 13 Sep. 2018, the contents of which are incorporated by reference herein.

BACKGROUND

The present disclosure relates to an apparatus for processing a signal, such as an analog signal, for input to a neural network. It also relates to a neural network processing device including the apparatus for processing the analog signal and a neural network. Associated methods and computer programs are also disclosed.

SUMMARY

According to a first aspect of the present disclosure there is provided an apparatus for processing a signal for input to a neural network, the apparatus configured to:
  receive a signal comprising a plurality of samples of an analog signal over time;
  determine at least one frame comprising a group of consecutive samples of the signal, wherein the or each frame includes a first number of samples;
  for each frame, determine a set of correlation values comprising a second number of correlation values, the second number less than the first number, each correlation value of the set of correlation values based on an autocorrelation of the frame at a plurality of different time lags;
  provide an output based on the set of correlation values corresponding to the or each of the frames for a neural network for one or more of classification of the analog signal by the neural network and training the neural network based on a predetermined classification.

In one or more embodiments, for each frame, the apparatus is configured to normalize each of the correlation values of the set of correlation values based on an autocorrelation of the frame at a zero time lag.

In one or more embodiments, the apparatus is configured to determine a plurality of frames, each frame comprising a group of consecutive samples of the signal wherein one of:
  at least some of the consecutive frames comprise groups of consecutive samples that have a partial overlap with each other; and
  at least some of the consecutive frames comprise consecutive groups of consecutive samples that are non-overlapping.

In one or more embodiments, a maximum time lag of the plurality of different time lags is based on a sampling frequency used to obtain the plurality of samples of the analog signal.

In one or more embodiments, the apparatus is configured to determine a plurality of frames and determine one or more further correlation values based on a cross-correlation between frames of the plurality of frames, the output including said further correlation values and the sets of correlation values.

In one or more embodiments, the apparatus is further configured to generate an image, comprising a plurality of pixels, based on the one or more sets of correlation values, wherein the correlation values determine one or more of a pixel colour and pixel brightness and a pixel position in the image is based on a position of the correlation value in the set of correlation values and a position of the set in the plurality of sets; and
  wherein said output, provided for the neural network, comprises said image.

In one or more embodiments, said one or more sets of correlation values comprise time-domain correlation values.

In one or more examples, wherein the apparatus is configured to determine a plurality of frames and wherein each frame is represented as a column vector of the consecutive samples, and wherein the apparatus is configured to form a matrix having columns formed of the plurality of column vectors organized such that the samples thereof comprise consecutive groups of samples.

In one or more embodiments, the apparatus is configured to determine a plurality of frames and the apparatus is configured to represent the set of correlation values of each frame as a column vector wherein the set of correlation values have a predetermined order in the column vector and wherein the apparatus is configured to generate a correlation value matrix having columns formed of the column vectors, and wherein the column vectors of correlation values are arranged in an order corresponding to a time order of the frames used to generate the sets, in terms of the samples the frames contain.

In one or more embodiments, the apparatus is configured to generate an image from said correlation value matrix.

In one or more embodiments, at least one of:
  the apparatus comprises a speech processing apparatus and the signal comprises a signal representative of speech; and
  the apparatus comprises a gesture processing apparatus and the signal comprises a signal representative of movement of at least part of a body of a user.

According to a second aspect of the present disclosure there is provided a neural network processing device comprising a neural network configured to receive, as input, the output of the apparatus of the first aspect.

In one or more embodiments, the neural network comprises a convolutional neural network and the output of the apparatus comprises an image, comprising a plurality of pixels, based on the one or more sets of correlation values, wherein the correlation values determine one or more of a pixel colour and pixel brightness and a pixel position in the image is based on a position of the correlation value in the set of correlation values and a position of the set in the plurality of sets when the sets are arranged in an order corresponding to a time order of the frames used to generate the sets, in terms of the samples the frames contain.

In one or more embodiments, the neural network comprises a neural network having less than four layers.

According to a third aspect of the present disclosure there is provided a method for processing a signal for input to a neural network, the method comprising:
  receiving a signal comprising a plurality of samples of an analog signal over time;
  determining at least one frame comprising a group of consecutive samples of the signal, wherein the or each frame includes a first number of samples;
  for each frame, determining a set of correlation values comprising a second number of correlation values, the second number less than the first number, each correlation value of the set of correlation values based on an autocorrelation of the frame at a plurality of different time lags; and providing an output based on the set of correlation values corresponding to the or each of the frames for a neural network for one or more of classification of the analog signal by the neural network and training the neural network based on a predetermined classification.

According to a fourth aspect of the present disclosure there is provided computer program or computer readable medium comprising computer program code configured to, when executed on a processor having said computer program code stored in a memory associated with the processor provides for the performance of the method of the third aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

The project leading to this application has received funding from the Electronic Component Systems for European Leadership Joint Undertaking under grant agreement No 737487. This Joint Undertaking receives support from the European Union's Horizon 2020 research and innovation programme and Belgium, Netherlands, France, Germany, Austria, Spain, Czech Republic, Norway.

The use of neural networks and machine learning to perform processing of signals is becoming more common. Neural networks may be used to classify an input such as for determining the content of an input. For example, in automatic speech recognition, the input signal may be an analog signal representative of speech and the neural network may be configured to determine the content of the speech, i.e. what is said. In other examples, the input signal may comprise a signal from one or more inertial sensors that monitor the movement of a user and the neural network may be configured to determine a gesture represented by that movement. Not to be limited by these examples, it will be appreciated that neural networks may find application in processing analog signals representative of many different types of input.

It is known to process, also known as "pre-process", an analog signal to provide an input to a neural network in a particular form. Automatic speech recognition (ASR) technologies, for example, such as Mel-frequency cepstral coefficients (MFCC) based techniques, linear predictive cepstral coefficients (LPCC) based techniques, or perceptual linear predictive coefficients (PLP) based techniques have shown prominent activity in the field using pre-processed analog signals.

Common to these techniques is a principal to convert the high dimensional input of the speech signal into refined discriminative features. This is to allow neural networks or "machine learning technologies" to understand unique features from a particular, processed, input feature map. Such refined discriminative features include algorithms to transform the sound into frequency domain based auditory images, spectrogram image features, or spectrogram based sub-band power distributions.

In general, in some examples, the use of neural networks comprises two parts: a front-end "pre-processing" step where an analog input is modified for input to a neural network and a back-end, which comprises the neural network. Some techniques may require a higher level of computational complexity in the front-end process(es) and may subsequently require a lower level of computational complexity neural network. Other techniques may require a lower level of computational complexity in the front-end process(es) and may subsequently require a higher level of computational complexity in the neural network.

In one or more examples, we provide an apparatus that may provide for efficient processing of an input signal to form an output signal for input to a neural network, without requiring a neural network of high computational complexity.

Figure 1:
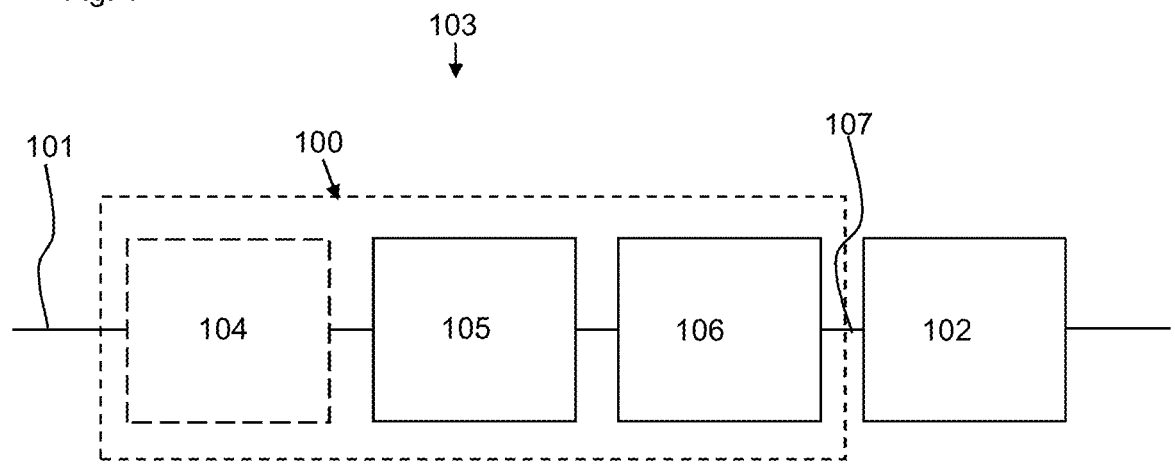
FIG. 1 shows an example embodiment of an apparatus for processing a signal for input to a neural network.

Example FIG. 1 shows an apparatus 100 for processing a signal 101 for input to a neural network 102. The apparatus 100 can be considered to be a signal processing apparatus, such as a neural network input processing apparatus. FIG. 1 also shows a neural network processing device 103 when the apparatus 100 is provided in combination with the neural network 102. Thus, the neural network processing device 103 comprises the neural network 102 configured to receive, as input, the output of the apparatus 100. Thus, the apparatus 100 performs pre-processing of the input to the neural network 102.

Figure 2:
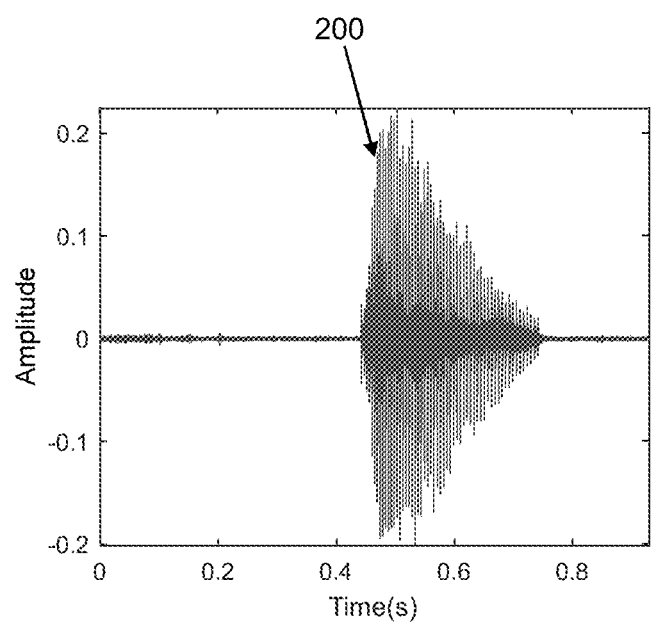
FIG. 2 shows an example analog signal.

The apparatus 100 is configured to receive the signal 101. The signal may be an analog signal and the apparatus 100 may include a signal sampling block 104 to sample the analog signal at a sampling rate, Fs. In other examples, the signal 101 may already have been sampled by a different apparatus. In either circumstance, the signal 101 may comprise a plurality of samples of an analog signal over time. For example, if the analog signal is a speech signal, e.g. representative of a user's voice, the plurality of samples may represent the amplitude of the speech signal over time. FIG. 2 shows an example speech input signal 200 showing a signal amplitude over time. In other examples, if the analog signal is a movement sensor input, the plurality of samples may be indicative of an angle of a sensor relative to a reference direction over time. It will be appreciated that the input signal may be any other time domain signal.

The signal sampling block 104 may perform filtering of the analog signal or samples.

The apparatus 100 is shown in FIG. 1 as having a series of functional blocks 104, 105, 106 that notionally perform a different function. However, it will be appreciated that the processing performed by the apparatus 100 may or may not be logically split into such blocks and may, for example, be performed by a general-purpose processor or one or more signal processors. Nevertheless, the following description refers to the blocks 104, 105, 106 performing the following functions for ease of understanding.

The apparatus 100 may include a frame determination block 105 configured to determine at least one frame comprising a group of consecutive samples of the signal 101, wherein the or each frame includes a first number of samples. The input signal 101 may be considered to comprise a time-consecutive string of samples. The apparatus 100 may be configured to divide that string into frames comprising a number of consecutive samples. The number of consecutive samples in each frame may be equal to or less than the number of samples of the signal 101. The number of samples in each frame may be the same for all frames. In one or more examples, each frame may partially overlap with an adjacent frame in terms of the samples it contains and in other examples, the frames may be non-overlapping. Thus, in such an example, a first frame may contain the first "x" samples and the next frame may comprise the next "x" samples starting at the immediately adjacent sample to a final sample in the preceding frame, until the end of the number of samples is reached. It will be appreciated that the samples of the signal 101 may be padded with zeros or other "null" values to provide an integer multiple of frames having the same number of samples (or "null" values) in each, whether the frames include overlapping samples or not. In other examples, no padding is provided and one of the frames may have different number of samples to the others. Thus, each frame comprises a time-domain set of samples of the analog signal.

The apparatus 100 may further includes a correlation value determination block 106 configured to, for each frame, determine a set of correlation values, each correlation value of the set of correlation values based on an autocorrelation of the time-domain samples of the frame at a plurality of different time lags. Each set of correlation values comprises a second number of correlation values, the second number less than the first number. Accordingly, the correlation value determination block 106 reduces the size of the data that represents the signal.

Thus, in one or more examples, each frame of samples is correlated with a time-shifted version of itself, the frame time-shifted by a number of samples defined by the set of predetermined time lags. The output of such a correlation operation may comprise a single correlation value for each time lag used that is indicative of the similarity between the frame and its time-shifted version. Accordingly, a number of correlation values is obtained corresponding to the number of predetermined time lags with which auto correlation was performed. In one or more examples, the correlation values are normalized. Said normalization may be relative to a maximum correlation value. In other examples, said normalization may be relative to a correlation value obtained based on an autocorrelation of the frame at a zero time lag, which may be equal to a square of the frame's magnitude when the frame is represented as a vector. Thus, the correlation values comprise correlation values of time-domain samples.

The apparatus 100 may be further configured, at 107 to provide an output for the neural network 102. The output 107 is based on the set of correlation values determined for each of the one or more frames. The apparatus 100 is thus configured to process the input signal 101 for receipt by the neural network 102. Optionally, the apparatus 100 may be configured to process the input signal such that a neural network may one or more of: classify the analog signal based on its predetermined training data and train the neural network based on a predetermined classification for the input signal 101.

Figure 3:
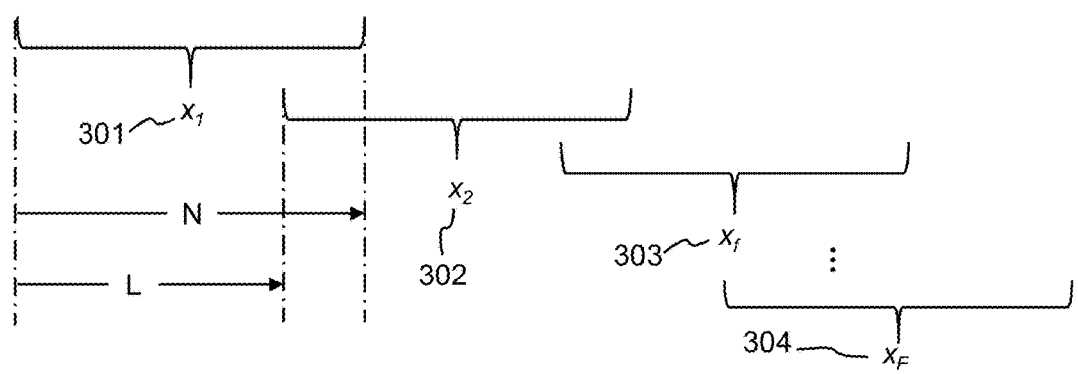
FIG. 3 shows an example process performed by the apparatus of FIG. 1.
Figure 3:
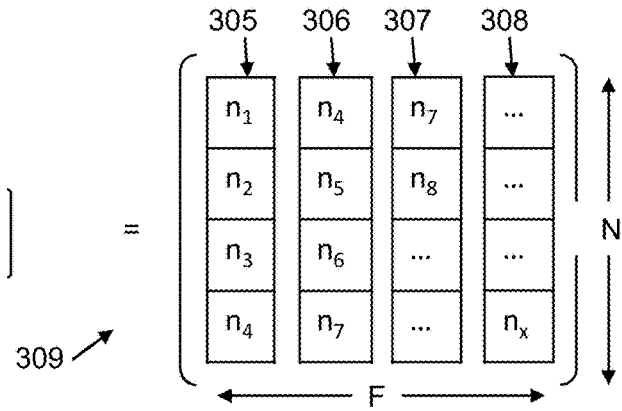

FIG. 3 illustrates the functionality of the apparatus 100 shown in FIG. 1 in more detail and will be described below.

Let s[n] be the analog signal 101, such as a speech signal, of finite length, which is shown at 300. The speech signal 300 is shown as a string of time consecutive samples $n_1$ to $n_x$. As described above, the block 104 may provide s[n].

As described above the block 105 may provide for the formation of frames from the sampled analog input signal. Thus, the speech signal 300 is divided into multiple overlapped or non-overlapped frames $x_f$ wherein frames $x_1$, $x_2$, $x_f$ ... and $x_F$ are shown at 301, 302, 303, 304. The frames $x_f$ each comprise a plurality of samples N and may be represented as column vectors 305, 306, 307, 308 of length N samples. In the simplified examples of FIG. 3, N is equal to four as each column vector 305-308 or frame 301-304 comprises four samples. Thus, $x_f \subset s$.

The apparatus 100 may be configured to organise the multiple frames or column vectors in a matrix X, of size N×F, where F is the number of the overlapped or non-overlapped contiguous frames 301-304, as represented by equation 1 and wherein the matrix X is shown at 309.

$$X=[x_1 \ldots x_f \ldots x_F] \quad (1)$$

The matrix 309 represented by equation (1) comprises column vector frames overlapped using a fixed frame size (N) and a fixed stride (L). The frame size thus comprises the number of consecutive samples in each frame and the stride comprises the number of samples between immediately adjacent frames. In this example, L is equal to three because a first sample of $x_2$ 302 is three samples ahead of the first sample of $x_1$ and, likewise, a first sample of $x_f$ is three samples ahead of the first sample of its preceding frame e.g. $x_2$. It will be appreciated that the number of samples in a frame, N, and the stride length, L, may take other values in other embodiments. For example, a more practical example may provide frames having 400 samples and the stride length may be 160 samples. In embodiments where there is no overlap in terms of the constituent samples in each frame, the stride L may be equal to the frame size N.

Thus, in general terms, the apparatus 100 may be configured to determine the plurality of frames 301-304 wherein each frame comprises a group of consecutive samples, n, of the signal s[n] wherein at least some of the consecutive frames, such as $x_1$ and $x_2$ or $x_2$ and $x_3$, comprise groups of contiguous samples that have a partial overlap with each other. In example FIG. 3, the overlap between frame 301 and immediately adjacent frame 302 comprises sample $n_4$.

Further, in general terms and in one or more other examples, the apparatus 100 may be configured to determine the plurality of frames 301-304 wherein each frame comprises a group of consecutive samples, n, of the signal s[n] wherein at least some of the consecutive frames comprise consecutive groups of consecutive samples that are non-overlapping. Thus, each of the samples may be included in only one of the plurality of frames.

As described above, in this example, the apparatus 100 is configured to represent each frame as a column vector 305-308 of contiguous samples and form the matrix 309 having columns formed of the plurality of column vectors 305-308 organized such that the samples thereof comprise consecutive groups of samples. Accordingly, the frames/column vectors 305-308 may be arranged to form the matrix 309 such that samples at corresponding positions in each frame increase or decrease monotonically in time.

Thus, in one or more examples, the frames 301-304 are obtained from the time-ordered samples and arranged in time order themselves based on the constituent samples. However, it will be appreciated that the frames/column vectors may be arranged in any other predetermined manner.

In one or more examples, the matrix 309 may comprise the output of the frame determination block 105. In other examples, the frames may be output in another format, such as other than in a matrix arrangement.

The determination of the sets of correlation values, such as by the correlation determination block 106, will now be described. The apparatus may be configured to determine a correlation value matrix 310 formed of the sets of correlation values.

In one or more examples, the correlation value matrix 310 comprises a set of correlation values which are represented as a plurality of arrays or column vectors 311, 312, 313, 314 in FIG. 3. The first correlation value of each set comprises the result of autocorrelating the respective frame at the first time lag value, the second correlation value of each set comprises the result of autocorrelating the respective frame at the second time lag value and so on until the final correlation value of each set, which comprises the result of autocorrelating the respective frame at the Mth time lag value.

More formally, let $r_{f,m}$ (a column vector of size M), be the autocorrelation of each frame $x_f$ (represented in equation (1) and shown as column vectors 305-308) and performed at a predetermined number (M) of time lags (m). It will be appreciated that the time lags may be represented in terms of an integer number of samples. The predetermined number of time lags comprising a plurality of different time lags m. Thus, the first time lag may comprise a time shift of +8 samples, the second time lag may comprise a time shift of +16 samples and the Mth time lag may comprise a time shift of +35 samples or whatever other time lags as may be selected.

The apparatus 100 may be configured to determine the correlation value matrix R of size M×F as represented in equation 2 and shown at 310, $$R = [r_1, m \ldots r_{f,m} \ldots r_{F,m}] \quad (2)$$

wherein each $r_{f,m}$ is a column vector which may be described as, $$r_{f,m} = \frac{1}{r_{(x_f x_f)0}} \begin{bmatrix} r_{(x_f x_f)1} \\ \vdots \\ r_{(x_f x_f)m} \\ \vdots \\ r_{(x_f x_f)M} \end{bmatrix} \quad (3)$$

Where $r_{(x_f x_f)0}$ is the zero-lag autocorrelation, $r_{(x_f x_f)1}$ is the first time lag value autocorrelation and $r_{(x_f x_f)M}$ is the M-th time lag value autocorrelation of each frame in matrix 309. The process of computing each is shown in equation 4 below, $$r_{f,m} = \frac{1}{\sum_{n=0}^{N-1} x_f(n)x_f(n)} \begin{bmatrix} \sum_{n=0}^{N-1-1} x_f(n+1)x_f(n) \\ \vdots \\ \sum_{n=0}^{N-m-1} x_f(n+m)x_f(n) \\ \vdots \\ \sum_{n=0}^{N-M-1} x_f(n+M)x_f(n) \end{bmatrix} \quad (4)$$

Where M is the maximum time lag and m is one of the time lags. It will be appreciated that the zero-lag may comprise an autocorrelation of the column vector with its non-time shifted self. In general, the process of determining the correlation values may comprise determination of a dot product of each column vector 305-308 with a time shifted version of itself based on each of the time lags.

As will be evident from equation 4 each correlation value may be normalized based on the correlation value determined by the autocorrelation of the frame at a zero time shift, also referred to as the zero-lag correlation. In other examples a different normalization factor may be used.

We refer to $r_{f,m}$ (eq. 4) as a frame-wise multi-lag autocorrelation vector.

The time lags of the plurality of different time lags may comprise positive values or negative values or a combination of both.

In one or more examples, each time lag of the plurality of different time lags corresponds to a different (e.g. integer) multiple of a sampling interval time, wherein the sampling interval time comprises 1/Fs seconds, where Fs is the sampling rate used to sample the analog signal.

In one or more examples, the maximum time lag of the plurality of different time lags is based on the sampling frequency Fs used to obtain the plurality of samples of the analog signal. In particular, in one or more examples, the Mth time lag or maximum time lag may be selected to determine a correlation value substantially at the lowest frequency of interest. Thus, the Mth or maximum time lag of the plurality of time lags may be determined by the sampling frequency, Fs, of the analog signal 101 divided by the lowest frequency of interest, $F_{low}$, that it is desirable for the neural network 102 to consider. Thus, in one or more examples, the apparatus 100 may be provided with the lowest frequency of interest and may determine the maximum time lag as $Fs/Fl_{ow}$. The remaining time lags of the plurality of time lags may comprise values less that the maximum time lag M.

In one or more examples, the number of different time lags and thereby the second number of correlation values is determined based on the following factors:
the range of frequency components in the signal 101 that are of interest to the application, and the minimum frequency component of the signal 101.

Thus, for an analog signal that comprises speech, a number of different time lags may be selected that corresponds to the frequency components common in human speech. In a system configured to analyse motion from sensors, the typical rate of change of the sensor input may determine the number and the spacing of the different time lags. In one or more examples, the apparatus may be configured to receive signal type information or analyse the frequency content of the input signal to determine the number and values of the time lags.

In one or more examples, the apparatus 100 may provide for adaptive sampling of the lags of the plurality of different time lags. Thus, in one or more examples, the apparatus may be configured to discard or not process one or more of the plurality of different time lags based on content of the signal 101. Thus, if the information yielded by a particular one of the time lags is not distinctive because the signal is absent of a correlation above a threshold at that time lag, the time lag may not be used in the generation of the output at 107.

In one or more examples, the apparatus 100 may provide for computing cross-frame correlation. Thus, in one or more examples, the apparatus may be configured to determine one or more "cross-frame" correlation values based on a cross correlation between different frames of a plurality of frames 301-304, said one or more cross-frame correlation values provided as output 107 with the set(s) of correlation values 311-314.

Thus, in summary, the apparatus 100 may be configured to represent the set of correlation values of each frame as a column vector 311, 312, 313, 314, wherein the set of correlation values have a predetermined order in the column vector. Thus, the time lags used to determine the correlation values may increase or decrease monotonically in terms of the number of samples the column vector/frame is shifted when auto correlation is performed. However, in general, the order of the correlation values in a respective set is based on the order of the lags of the plurality of time lags, which may be any predetermined order.

Further, in summary, the apparatus 100 may be configured to generate the correlation value matrix 310 having columns formed of the column vectors 311, 312, 313, 314, wherein the column vectors of correlation values are arranged in an order in the correlation value matrix 310 corresponding to a time order of the frames used to generate the respective sets of correlation values, in terms of the samples the respective frames contain.

In one or more examples, the apparatus 100 may be configured to, from the matrix R comprising the plurality of $r_{f,m}$ frame-wise Multi-Lag autocorrelation vectors, generate an image.

Figure 4:
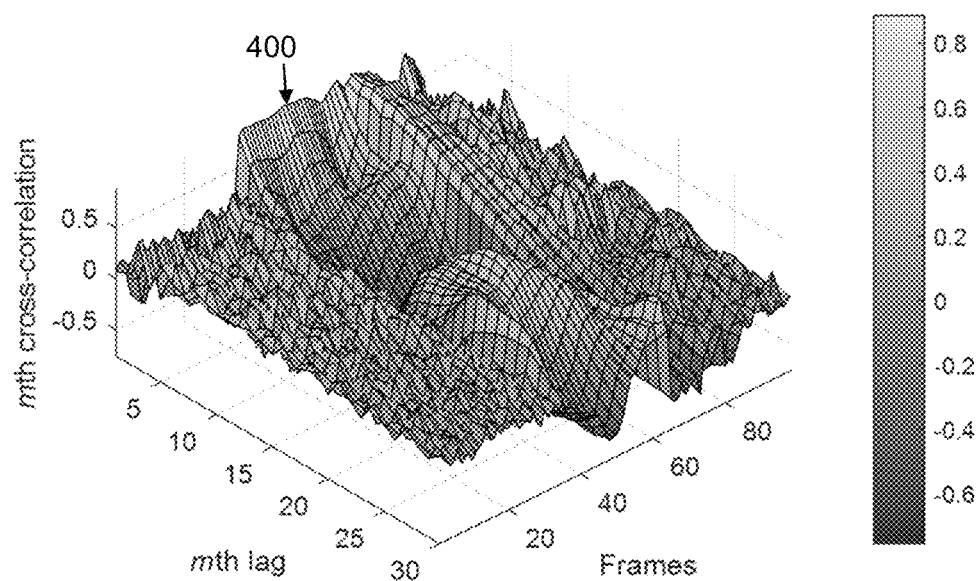
FIG. 4 shows an example surface map representation of the sets of correlation values.
Figure 5:
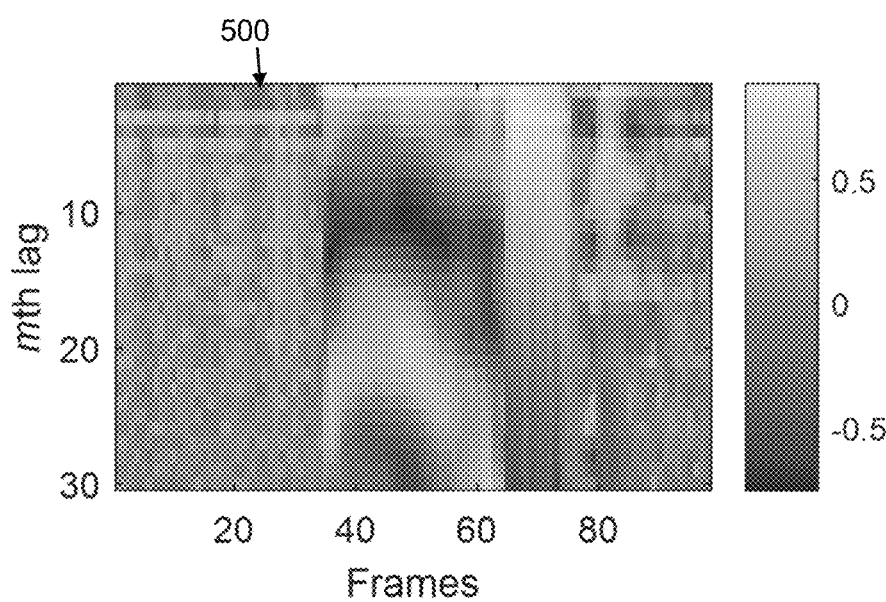
FIG. 5 shows a top view of the surface map of FIG. 4 comprising an example two-dimensional image for input to a neural network.

With reference to FIGS. 4 and 5, a surface map 400 and corresponding two-dimensional image 500 is shown based on the correlation values of the matrix R determined from the speech sample shown in FIG. 2. In FIG. 4, the x axis shows $1^{st}$ to Mth lags used, the y-axis shows the frame from which the correlation values are determined from the $1^{st}$ frame to the Fth frame and the z-axis shows the correlation value. In FIG. 5, the same information is represented where the x-axis shows the $1^{st}$ to Mth lags used, the y-axis shows the frame from which the correlation values are determined from the $1^{st}$ frame to the Fth frame but in this example rather than a z-axis, the correlation values are mapped to a hue or brightness. Accordingly, the apparatus 100 may be configured to provide a mapping from the correlation value to one or more of a hue and brightness or any other pixel characteristic to form an image that represents the values of the correlation value matrix.

The image 500 of FIG. 5 may comprise the output of the apparatus 100. Thus, the apparatus 100 may be configured to generate the image 500 comprising a plurality of pixels, based on the one or more sets of correlation values 311-314, wherein the correlation values determine one or more of a pixel colour and pixel brightness. Where the pixels are positioned in the image may be determined in a number of ways. However, in one or more examples, a pixel position in the image is based on a position of the correlation value in the set of correlation values and a position of the set in the plurality of sets when the sets are arranged in an order corresponding to a time order of the frames used to generate the sets, in terms of the samples the frames contain. Thus, correlation values in the first set/column vector 311 may comprise a first row or column of pixels in the image 500 and a second set/column vector 312 may comprise a second row or column of pixels in the image 500, e.g. a so-called x coordinate. Further, each set/column vector 311-314 has correlation values determined by the order in which the plurality of time lags was used to determine the correlation values. The position of the correlation value in the column vector 311-314 may determine where in the respective row/column the pixel is presented, e.g. a so-called y coordinate.

Figure 6:
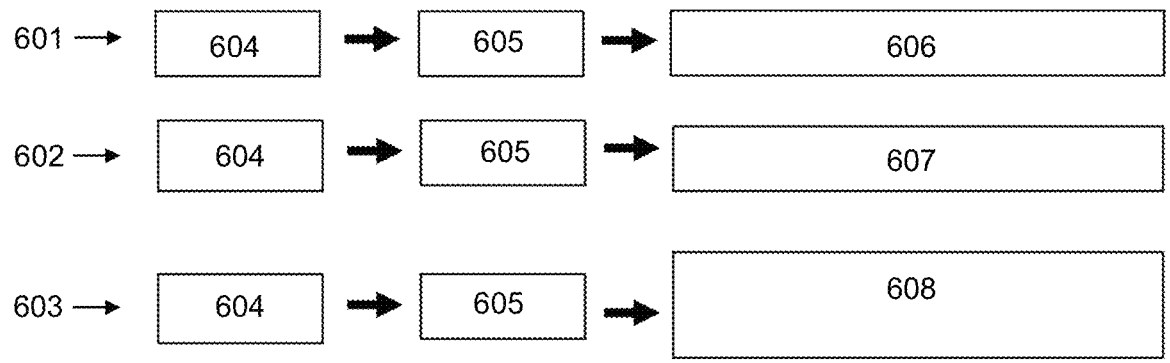
FIG. 6 shows three example embodiments of the neural network processing stages of a neural network processing device.

FIG. 6 shows three embodiments 601, 602, 603 in which the functionality of the apparatus 100 is shown as 604. The output of the apparatus 100, which may comprise image 500, is provided as input to a feature extraction stage or map 605 in all of the embodiments 601, 602, 603. In these examples, the neural network 102 comprises the feature extraction map 605 along with a further neural network which differs in each of the embodiments 601, 602, 603. In the first embodiment, the "second part" 606 of the neural network 102 comprises a hidden layer. In the second embodiment, the "second part" 607 of the neural network 102 comprises one or more of a recursive neural network (RNN), a Long Short-Term Memory (LSTM) or a Gated Recurrent Unit (GRU). In the third embodiment, the "second part" 608 of the neural network 102 comprises a hidden layer and one or more of a RNN, a LSTM or a GRU.

Figure 7:
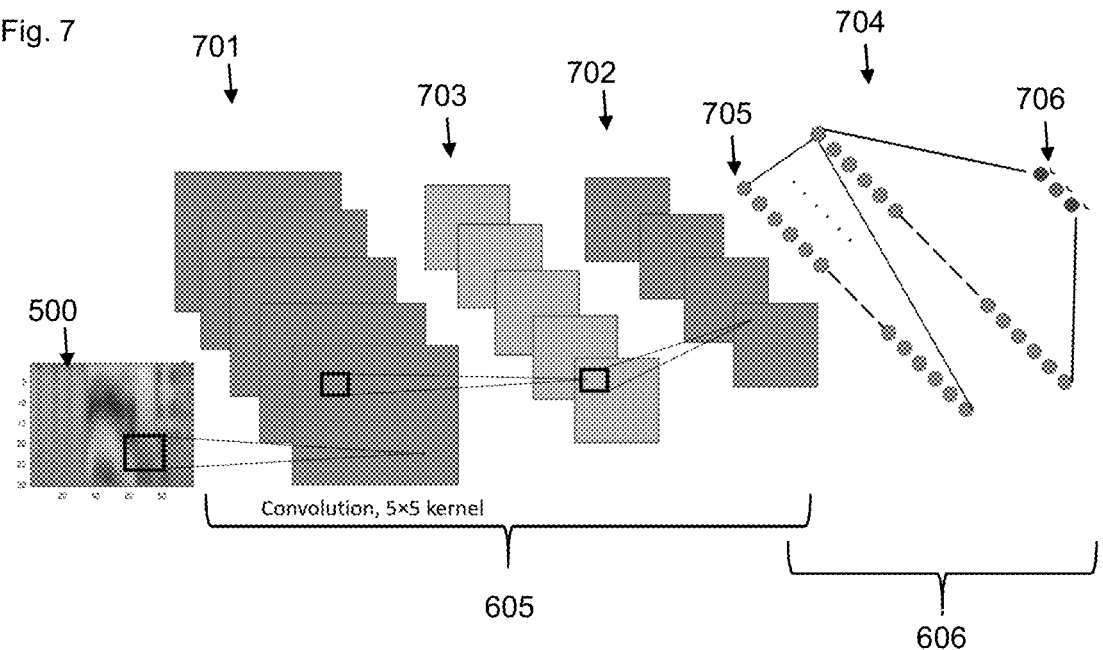
FIG. 7 shows an example convolutional neural network.

FIG. 7 shows in general terms the operation of the neural network 102. In particular it shows a neural network arrangement of the embodiment 601, which includes a feature extraction map stage "first part" 605 and a hidden layer "second part" 606. The neural network 102, in one or more examples, comprises a two-layer CNN comprising a first layer 701 and a second layer 702. The first layer 701 may determine five feature maps from the image 500. Following a "MaxPooling" stage 703, the second layer 702 may determine four feature maps. The final stage comprises the hidden layer 704, following a flattening stage 705, in which the input is classified at 706. It will be appreciated that while in this example, the neural network has two layers and a hidden layer in other examples, no "second part" 606, 607, 608 may be provided. Further, in one or more examples, the neural network 102 or, in particular a CNN, may have one, two, three, four, five, six or more layers. However, in one or more examples, the neural network, such as a CNN, comprises a neural network having less than four layers or less than three layers.

In summary, in one or more examples, the neural network 102 comprises a convolutional neural network 605, 701, 702 and the output of the apparatus 100 comprises the image 500, comprising a plurality of pixels, based on the one or more sets of correlation values, wherein the correlation values determine one or more of a pixel colour and pixel brightness and a pixel position in the image is based on a position of the correlation value in each of the sets of correlation values and a position of the set in the plurality of sets. In one or more examples, the sets are arranged in an order corresponding to a time order of the frames used to generate the sets, in terms of the samples the frames contain. In one or more examples, the correlation values are arranged in the sets in a predetermined order, such as by increasing or decreasing time lag used to determine them. However, any other predetermined order (for the order of the sets or the order of the correlation values in the sets) may be used if applied consistently across the training data for the neural network and then any new signal to be classified by the neural network.

Figure 8:
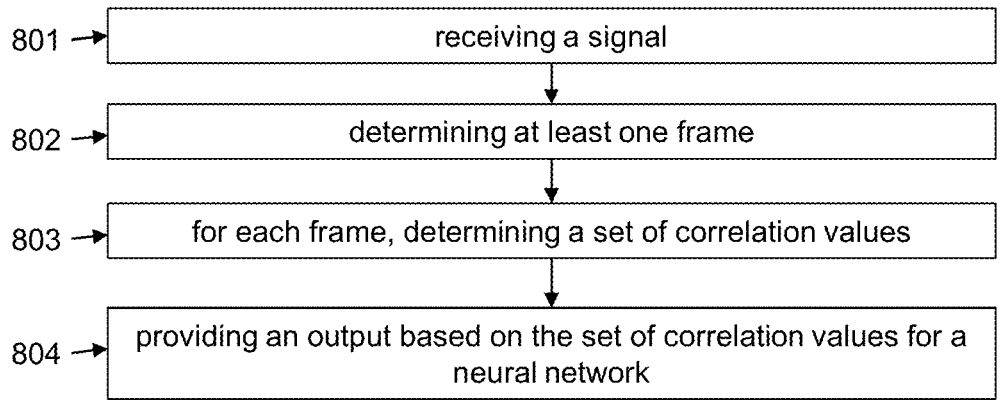
FIG. 8 shows an example flow chart illustrating a method.

FIG. 8 shows a method for processing a signal for input to a neural network, the method comprising:

receiving 801 a signal comprising a plurality of samples of an analog signal over time;

determining 802 at least one frame comprising a group of consecutive samples of the signal, wherein the or each frame includes a first number of samples;

for each frame, determining 803 a set of correlation values comprising a second number of correlation values, the second number less than the first number, each correlation value of the set of correlation values based on an autocorrelation of the frame at a plurality of different time lags; and providing an output 804 based on the set of correlation values corresponding to the or each of the frames for a neural network for one or more of classification of the analog signal by the neural network and training the neural network based on a predetermined classification.

Figure 9:
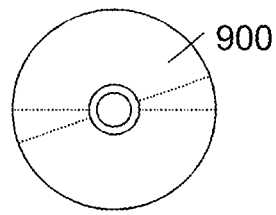
FIG. 9 shows an example computer readable medium.

FIG. 9 shows an example embodiment of a computer readable medium 900 comprising a compact disc, although other mediums may be used. The computer readable medium comprises computer program code configured to, when executed on a processor having said computer program code stored in a memory associated with the processor (which may be provided by the apparatus 100) provides for the performance of the method FIG. 8. In some examples, the computer readable medium may be any medium that has been programmed in such a way as to carry out an inventive function. The computer program code may be distributed between multiple memories of the same type, or multiple memories of a different type, such as ROM, RAM, flash, hard disk, solid state, etc.

Evaluation of the Neural Network Processing Device 103

In order to test the performance of the neural network processing device 103, images such as image 500, created from various analog signals using the above-described methodology is used as an input to a CNN 102. The objective in this evaluation is to assess the learnability from the image by classifying the speech inputs; 'bed', 'cat and 'happy', into three classes. As shown in FIG. 7 the neural network 102 comprises a CNN of two convolutional layers 701, 702 and one hidden layer 704 (the subsampling layer 703 and the flattening layer 705 are not counted because they are not learned). The first convolution layer 701 has 5 feature maps generated using five 5×5 kernels. The outputs of the first layer are then MaxPooled by a 2×2 window to be then passed to the second convolutional layer 702 that has four feature maps generated using 4×4 kernels. The feature maps are then flattened at 705 for a 128-unit dense layer before the classification is made at 706. As indicated previously, the attempt here is to assess the ability of learning for an embodiment of the neural network processing device described herein and the CNN 102 may take other forms (such as in terms of the number of layers or other parameters), which may have a different level of performance.

The data set used for the evaluation comprised 5071 sound files each of 1 second, which were separated into different ratios of training and validation sets for further validation.

The learning was implemented using an Adaptive Learning Rate Method, while the number of samples per gradient update or the batch size was set to 200. The training was performed over 200 iterations before reporting the final learning accuracy. The learning is early-stopped if the accuracy is no longer progressing.

In terms of the performance of the neural network when operating based on the input provided by the apparatus 100, the CNN 102 was able to learn from the image 500 features achieving 94.4% on the validation set The widely used MFCC features were extracted from the same data set using a commonly used technique, to be tested for comparison using the same CNN 102. However, for a fair comparison, we evaluated the performance of both MFCC and the embodiment described above, designated MFSTS, using different split ratio of the data, as shown in Table. 1.

TABLE 1

MFCC and MFSTS performance comparison on different data split ratio.

| Input features | Training set (% of Data) | Validation set (% of Data) | Validation accuracy |
| --- | --- | --- | --- |
| (MFSTS) | 90% | 10% | 94.4% |
| 30 × 98 input | 70% | 30% | 92.0% |
| features | 50% | 50% | 90.4% |
| (MFCC) | 90% | 10% | 94.4% |
| 11 × 98 input | 70% | 30% | 93.8% |
| features | 50% | 50% | 91.4% |

Given that we have enough training data, MFSTS gives same performance as that of MFCC. In this example, MFCC performs better on a reduced training data set, but because the present MFSTS technique generates an input for the neural network based on a time domain image and time domain processing, not frequency domain, the present method may have processing advantages which might mean reduced latency or cost if compared to MFCC. Thus, the apparatus 100 is configured not to perform Fourier transformations of the signal 101 and may therefore provide for efficient time-domain based processing of the signal 101 for providing an input to the neural network 102.

Additionally, more than 3-class validation performance has been performed. Table. 2 shows validation accuracy performed up to 5 classes. In this table, the MFSTS and MFCC based CNN were trained on 90% of the data and validated on the remaining 10%. As shown, the performance of MFSTS and MFCC are in good agreement on a variety of input words, using the same CNN structure in FIG. 7. Further learning performance improvement requires assessing different CNN structures which is beyond the scope of this document.

TABLE 2

Multi-class performance analysis using MFSTS and MFCC.

| | | Classes | | |
| --- | --- | --- | --- | --- |
| | | 3 | 4 | 5 |
| Spoken words | | Happy, Cat, Bed | Happy, Cat, Bed, Dog | Happy, Cat, Bed, Dog, Bird |
| Number of files | | 5071 | 6766 | 8451 |
| Validation | MFSTS | 94.4% | 92.3% | 91.5% |
| accuracy | MFCC | 94.4% | 94.1% | 92.5% |

The instructions and/or flowchart steps in the above figures may be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:
1. An apparatus for processing a signal for input to a neural network, the apparatus comprising:
an input configured to receive a signal comprising a plurality of samples of an analog signal over time; and
a processor coupled to the input and configured to:
determine at least one frame comprising a group of consecutive samples of the signal, wherein the or each frame includes a first number of samples,
for each frame, determine a set of correlation values comprising a second number of correlation values, the second number less than the first number, each correlation value of the set of correlation values based on an autocorrelation of the frame at a plurality of different time lags,
provide an output based on the set of correlation values corresponding to the or each of the frames for a neural network for one or more of classification of the analog signal by the neural network and training the neural network based on a predetermined classification; and
generate an image, comprising a plurality of pixels, based on the one or more sets of correlation values, wherein the correlation values determine one or more of a pixel color and pixel brightness and a pixel position in the image is based on a position of the correlation value in the set of correlation values and a position of the set in the plurality of sets,
wherein said output, provided for the neural network, comprises said image.

2. The apparatus of claim 1, wherein for each frame, the processor is configured to normalize each of the correlation values of the set of correlation values based on an autocorrelation of the frame at a zero time lag.

3. The apparatus of claim 1, wherein the processor is configured to determine a plurality of frames, each frame comprising a group of consecutive samples of the signal wherein one of:
at least some of the consecutive frames comprise groups of consecutive samples that have a partial overlap with each other; and
at least some of the consecutive frames comprise consecutive groups of consecutive samples that are non-overlapping.

4. The apparatus of claim 1, wherein a maximum time lag of the plurality of different time lags is based on a sampling frequency used to obtain the plurality of samples of the analog signal.

5. The apparatus of claim 1, wherein the processor is configured to determine a plurality of frames and determine one or more further correlation values based on a cross-correlation between frames of the plurality of frames, the output including said further correlation values and the sets of correlation values.

6. The apparatus of claim 1 wherein said one or more sets of correlation values comprise time-domain correlation values.

7. An apparatus for processing a signal for input to a neural network, the apparatus comprising:
an input configured to receive a signal comprising a plurality of samples of an analog signal over time; and
a processor coupled to the input and configured to:
determine at least one frame comprising a group of consecutive samples of the signal, wherein the or each frame includes a first number of samples,
for each frame, determine a set of correlation values comprising a second number of correlation values, the second number less than the first number, each correlation value of the set of correlation values based on an autocorrelation of the frame at a plurality of different time lags,
provide an output based on the set of correlation values corresponding to the or each of the frames for a neural network for one or more of classification of the analog signal by the neural network and training the neural network based on a predetermined classification;

determine a plurality of frames and the processor is configured to represent the set of correlation values of each frame as a column vector wherein the set of correlation values have a predetermined order in the column vector and wherein the processor is configured to generate a correlation value matrix having columns formed of the column vectors, and wherein the column vectors of correlation values are arranged in an order corresponding to a time order of the frames used to generate the sets, in terms of the samples the frames contain, wherein the processor is configured to generate an image from said correlation value matrix.

8. The apparatus of claim 1, wherein at least one of:

the apparatus comprises a speech processing apparatus and the signal comprises a signal representative of speech; and the apparatus comprises a gesture processing apparatus and the signal comprises a signal representative of movement of at least part of a body of a user.

9. A neural network processing device comprising:

a processor coupled to an input which is configured to receive a signal comprising a plurality of samples of an analog signal over time, the processor configured to:

determine at least one frame comprising a group of consecutive samples of the signal, wherein the or each frame includes a first number of samples, for each frame, determine a set of correlation values comprising a second number of correlation values, the second number less than the first number, each correlation value of the set of correlation values based on an autocorrelation of the frame at a plurality of different time lags, provide an output based on the set of correlation values corresponding to the or each of the frames for a neural network for one or more of classification of the analog signal by the neural network and training the neural network based on a predetermined classification; and a neural network configured to receive, as input, the output of the processor, wherein the neural network comprises a convolutional neural network and the output of the processor comprises an image, comprising a plurality of pixels, based on the one or more sets of correlation values, wherein the correlation values determine one or more of a pixel color and pixel brightness and a pixel position in the image is based on a position of the correlation value in the set of correlation values and a position of the set in the plurality of sets when the sets are arranged in an order corresponding to a time order of the frames used to generate the sets, in terms of the samples the frames contain.

10. The neural network processing device of claim 9, wherein the neural network comprises a neural network having less than four layers.

11. A method for processing a signal for input to a neural network, the method comprising:

receiving a signal comprising a plurality of samples of an analog signal over time;

determining at least one frame comprising a group of consecutive samples of the signal, wherein the or each frame includes a first number of samples;

for each frame, determining a set of correlation values comprising a second number of correlation values, the second number less than the first number, each correlation value of the set of correlation values based on an autocorrelation of the frame at a plurality of different time lags;

providing an output based on the set of correlation values corresponding to the or each of the frames for a neural network for one or more of classification of the analog signal by the neural network and training the neural network based on a predetermined classification; and generating an image, comprising a plurality of pixels, based on the one or more sets of correlation values, wherein the correlation values determine one or more of a pixel color and pixel brightness and a pixel position in the image is based on a position of the correlation value in the set of correlation values and a position of the set in the plurality of sets, wherein said output, provided for the neural network, comprises said image.

12. A computer program or computer readable medium comprising computer program code configured to, when executed on a processor having said computer program code stored in a memory associated with the processor provides for the performance of the method of claim 11.

13. The apparatus of claim 7, wherein for each frame, the processor is configured to normalize each of the correlation values of the set of correlation values based on an autocorrelation of the frame at a zero time lag.

14. The apparatus of claim 7, wherein the processor is configured to determine a plurality of frames, each frame comprising a group of consecutive samples of the signal wherein at least one of:

at least some of the consecutive frames comprise groups of consecutive samples that have a partial overlap with each other; and at least some of the consecutive frames comprise consecutive groups of consecutive samples that are non-overlapping.

15. The apparatus of claim 7, wherein a maximum time lag of the plurality of different time lags is based on a sampling frequency used to obtain the plurality of samples of the analog signal.

16. The apparatus of claim 7, wherein the processor is configured to determine a plurality of frames and determine one or more further correlation values based on a cross-correlation between frames of the plurality of frames, the output including said further correlation values and the sets of correlation values.

17. The apparatus of claim 7 wherein said one or more sets of correlation values comprise time-domain correlation values.

18. The apparatus of claim 7, wherein at least one of:

the apparatus comprises a speech processing apparatus and the signal comprises a signal representative of speech; and the apparatus comprises a gesture processing apparatus and the signal comprises a signal representative of movement of at least part of a body of a user.

* * * * *